United States Patent
Springstroh

(10) Patent No.: US 11,651,448 B2
(45) Date of Patent: May 16, 2023

(54) SYSTEMS AND METHODS FOR GENERATING A DATING PROFILE FOR A COMMUNITY-BASED DATING SERVICE OF A SOCIAL NETWORKING SYSTEM

(71) Applicant: Meta Platforms, Inc., Menlo Park, CA (US)

(72) Inventor: Jordan Springstroh, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 154 days.

(21) Appl. No.: 16/690,159

(22) Filed: Nov. 21, 2019

(65) Prior Publication Data

US 2021/0158457 A1 May 27, 2021

(51) Int. Cl.
| | |
|---|---|
| *G06Q 50/00* | (2012.01) |
| *G06Q 30/02* | (2012.01) |
| *G06Q 10/10* | (2012.01) |
| *G06F 16/9535* | (2019.01) |
| *H04L 67/306* | (2022.01) |
| *H04L 51/52* | (2022.01) |

(52) U.S. Cl.
CPC ......... *G06Q 50/01* (2013.01); *G06F 16/9535* (2019.01); *G06Q 10/10* (2013.01); *G06Q 30/02* (2013.01); *H04L 51/52* (2022.05); *H04L 67/306* (2013.01)

(58) Field of Classification Search
None
See application file for complete search history.

(56) References Cited

U.S. PATENT DOCUMENTS

| | | | | |
|---|---|---|---|---|
| 2006/0251338 | A1* | 11/2006 | Gokturk | G06F 16/583 707/E17.022 |
| 2010/0205211 | A1* | 8/2010 | Ghosh | G06F 16/9535 707/780 |
| 2012/0290978 | A1* | 11/2012 | Devecka | G06Q 30/0273 715/810 |
| 2013/0344968 | A1* | 12/2013 | Halfteck | A63F 13/79 463/43 |
| 2019/0147760 | A1* | 5/2019 | Bruckner | G10L 25/63 706/11 |
| 2019/0171725 | A1* | 6/2019 | Shen | G06Q 50/01 |

* cited by examiner

*Primary Examiner* — Kevin T Bates
*Assistant Examiner* — Emad Siddiqi
(74) *Attorney, Agent, or Firm* — Greenberg Traurig, LLP

(57) ABSTRACT

A disclosed computer-implemented method may include receiving a request to generate a dating profile for a user of a community-based dating service of a social networking system based on information associated with the user and maintained by the social networking system. The method may also include accessing information associated with the user and maintained by the social networking system. The method may additionally include selecting, from the information associated with the user and maintained by the social networking system (1) a set of contextual information associated with the user, and (2) a set of media items associated with the user. The method may further include generating the dating profile for the user by arranging the set of contextual information and the set of media items within a dating interface of the social networking system. Various other methods, systems, and computer-readable media are also disclosed.

20 Claims, 16 Drawing Sheets

View 700

| | Edit Information | Done |
|---|---|---|
| | ✏ Intro | Visible |

702 {
Write about yourself, what you're looking for, or anything else...
500

704 {
☺ About

| First Name Visible  Johnson | ⓘ |
| Age. Visible  24 | ⓘ |
| City. Visible  San Francisco, California | › |
| Gender. Only Me  Man | › |
| Job Title. Visible  Product Designer | › |
| Company  Company | › |
| Education. Visible  University of Campus | › |

View 1000

View 1100

View 1200

View 1300

View 1600

SYSTEMS AND METHODS FOR GENERATING A DATING PROFILE FOR A COMMUNITY-BASED DATING SERVICE OF A SOCIAL NETWORKING SYSTEM

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
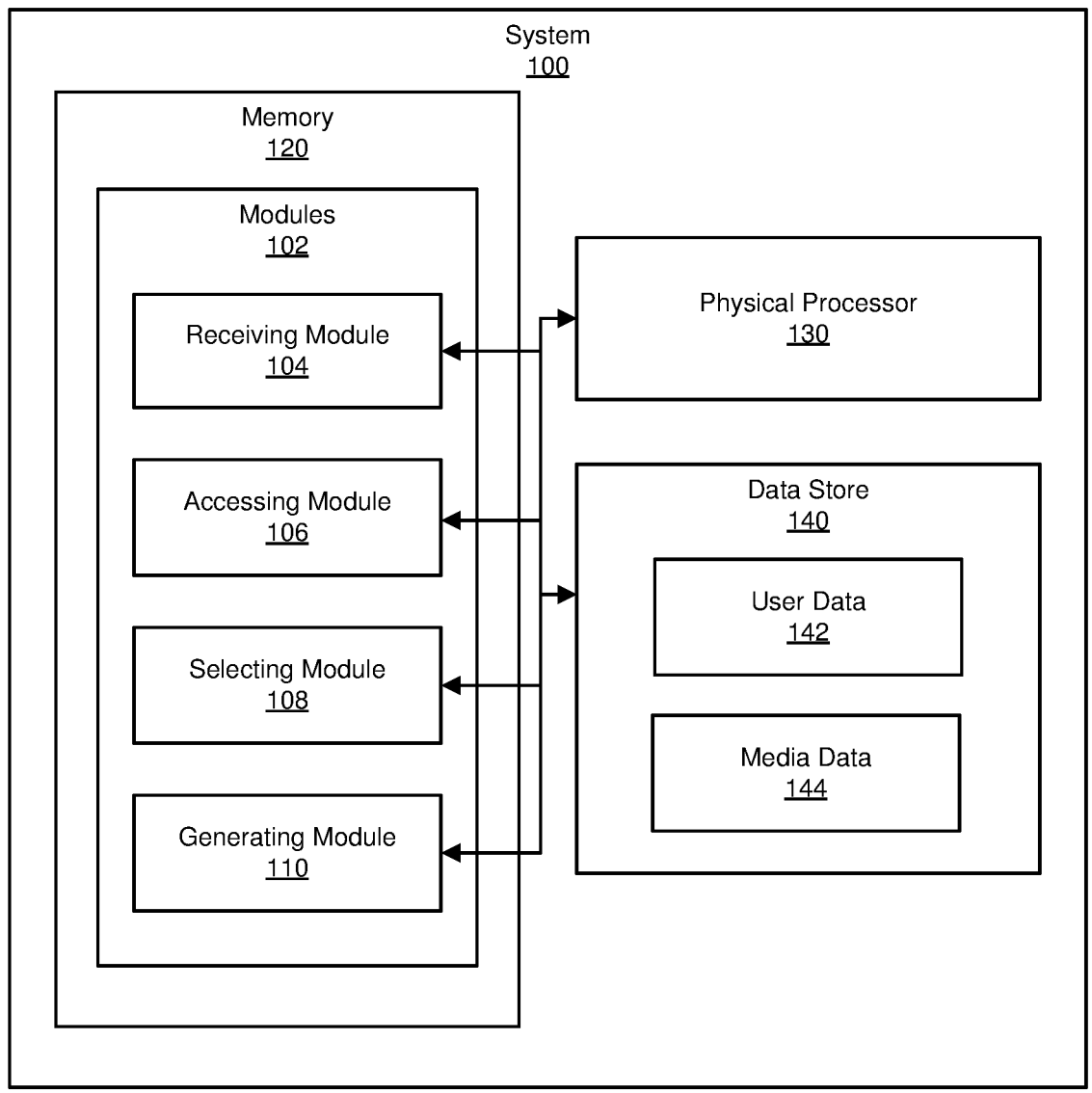
FIG. 1 is a block diagram of an example system for generating a dating profile for a community-based dating service of a social networking system.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Modern social networking systems have revolutionized how people connect to and communicate with each other. For example, users of social networking systems may share information (e.g., posts, news stories, media, etc.) with other users, join groups that include other users who share common interests, and so forth. Unfortunately, it may be difficult for users of a social networking system to initiate new relationships with other users of the social networking system.

For example, a user may wish to represent himself or herself differently to potential dating connections than other connections (e.g., friends, family, acquaintances, etc.) within the social networking system. Therefore, some users may wish to create a specialized dating profile to represent themselves within a dating service of a social networking system. However, creating effective dating profiles can be a difficult, stressful, and cumbersome process. For example, interface flows intended to aid users in creating effective dating profiles may be complicated or time consuming to complete. Additionally, users often do not understand what information or media may be helpful to include in effective dating profiles. Hence, the instant application identifies and addresses a need for additional systems and methods to improve or facilitate creation of dating profiles for a community-based dating service of a social networking system.

The present disclosure is generally directed to systems and methods for generating a dating profile for a community-based dating service of a social networking system. As will be explained in greater detail below, embodiments of the instant disclosure may, at the direction of and/or with the permission of a user of a social networking system, automatically generate a dating profile for the user for use in a community-based dating feature or service of the social networking system based on information associated with the user that is maintained by the social networking system.

In some embodiments, an example system may receive a request to generate a dating profile for a user of a community-based dating service of a social networking system based on information associated with the user and maintained by the social networking system. For example, the example system may present a user interface that includes a control that, when interacted with by the user, may cause the example system to receive a request from the user to generate a dating profile for the user based on information associated with the user and maintained by the social networking system. When the user interacts with the control, the example system may receive such a request.

The example system may then access information associated with the user and maintained by the social networking system. For example, the social networking system may maintain contextual information associated with the user, such as the user's hometown, place of residence, employer, a relationship status, and so forth. The social networking system may also maintain media data associated with the user, such as digital photographs or video files uploaded to the social networking system by the user. The example system may access this contextual and/or media information and may select a set of contextual information associated with the user and a set of media items associated with the user.

The example system may select the set of contextual information and/or the set of media items based on any suitable criteria. For example, the example system may include in the set of contextual information a place of residence of the user, an employer of the user, and/or a relationship status of the user because these items of contextual information (e.g., "contextual items") may be particularly relevant and/or important to forming dating connections with other participants in the dating service. Additionally or alternatively, the example system may include an image in the set of media items because the system may determine that the image has more than a threshold level of engagement within the social networking system, such as a high number of times that users of the social networking system have interacted with or indicated approval of (e.g., "liked") the media item.

The example system may then generate a dating profile for the user by arranging the set of contextual information and the set of media items within a dating interface of the social networking system. The example system may further provide various interfaces and/or interactive tools to enable the user to modify the generated dating profile and/or to save the generated dating profile for use in the dating service of the social networking system.

By generating a dating profile for a user based on information already maintained by the social networking system, the systems and methods described herein may simplify or streamline creation of a dating profile for the user. Furthermore, systems and methods described herein may enable the user to create a dating profile that may be more effective at assisting the user in forming dating connections within the dating service of the social networking system than the user may be capable of creating through conventional systems and methods for creating dating profiles.

Additionally, embodiments of the instant disclosure may provide for a more efficient usage of telecommunications resources (e.g., bandwidth) than traditional or conventional dating profile creation options. For example, by generating a dating profile for the user based on information already maintained by the social networking system, the user need not consume bandwidth resources uploading media items or contextual information that the user may wish to include in a dating profile that may already be maintained by the social networking system. Hence, the systems and methods described herein may use significantly fewer bandwidth resources than traditional or conventional dating profile creation systems and methods.

As will be described in greater detail below, embodiments of the systems and methods described herein may interact with personal information of a user, such as information about the user (e.g., contextual information) and/or media items associated with the user. By way of example, and without limitation, embodiments of the systems and methods described herein may maintain, store, access, transmit, communicate, modify, present, and/or otherwise interact with personal information of a user. Embodiments of the instant disclosure may interact with personal information of a user only in accordance with permissions granted by the user, such as via various conventional or traditional opt-in methods. Likewise, embodiments of the instant disclosure may be prevented from interacting with personal information of a user without first obtaining permission from the user to do so. In this and other ways, the systems and methods described herein may protect a user's privacy and may safeguard the personal information of the user against inappropriate and/or unapproved disclosure, dissemination, and/or misuse.

The following will provide, with reference to FIGS. 1-2 and 4-16, detailed descriptions of systems for generating a dating profile for a community-based dating service of a social networking system. Detailed descriptions of corresponding computer-implemented methods will also be provided in connection with FIG. 3.

FIG. 1 is a block diagram of an example system 100 for generating a dating profile for a community-based dating service of a social networking system. As illustrated in this figure, example system 100 may include one or more modules 102 for performing one or more tasks. As will be explained in greater detail below, modules 102 may include a receiving module 104 that receives a request to generate a dating profile for a user of a community-based dating service of a social networking system based on information associated with the user and maintained by the social networking system. Example system 100 may also include an accessing module 106 that accesses information associated with the user and maintained by the social networking system.

Example system 100 may also include a selecting module 108 that selects, from the information associated with the user and maintained by the social networking system (1) a set of contextual information associated with the user, and (2) a set of media items associated with the user. Example system 100 may further include a generating module 110 that generates the dating profile for the user by arranging the set of contextual information and the set of media items within a dating interface of the social networking system.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate generating a dating profile for a community-based dating service of a social networking system. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As also illustrated in FIG. 1, example system 100 may also include one or more stores of data, such as data store 140. Data store 140 may represent portions of a single data store or computing device or a plurality of data stores or computing devices. In some embodiments, data store 140 may be a logical container for data and may be implemented in various forms (e.g., a database, a file, file system, a data structure, etc.). Examples of data store 140 may include, without limitation, one or more files, file systems, data stores, databases, and/or database management systems such as an operational data store (ODS), a relational database, a NoSQL database, a NewSQL database, and/or any other suitable organized collection of data.

In some embodiments, data store 140 may include user data 142 and media data 144. In some examples, at least part of user data 142 and/or media data 144 may be included in and/or a part of a social networking profile associated with a user. User data 142 may include information associated with one or more users of the social networking system. For example, and without limitation, user data 142 may include data associated with a homeplace of a user, a place of residence of a user, an employer of a user, a school associated with the user, a relationship status of the user, a message from the user to participants in a community-based dating service of the social networking system, the user's membership in one or more interest-based communities, and so forth.

In some examples, media data 144 may include information including and/or associated with one or more media items. In some examples, a media item may include any portion of a file, document, or other data item that may be stored, hosted, maintained, received, and/or accessed by data store 140 and that may include any combination of text information, audio information, visual information, audio-visual information, and so forth. In one or more examples, a media item may include a digital image, such as a digital representation of a photograph.

In some embodiments, media data 144 may additionally include information associated with the one or more media items included in media data 144 (e.g., metadata). As an example, for at least one media item included in media data 144, media data 144 may also include, without limitation, information indicating one or more associations of the media item with one or more users of the social networking system, a time associated with the media item, a publisher associated with the media item, at least one topic associated with the media item, information indicating one or more associations of the media item with one or more additional media items, information indicating content of the media item (e.g., whether an image included in the media item includes at least a portion of one or more persons, whether the image includes at least a portion of one or more pets, whether the image includes more than one person, an identity of a person included in the image, etc.) and so forth.

Figure 2:
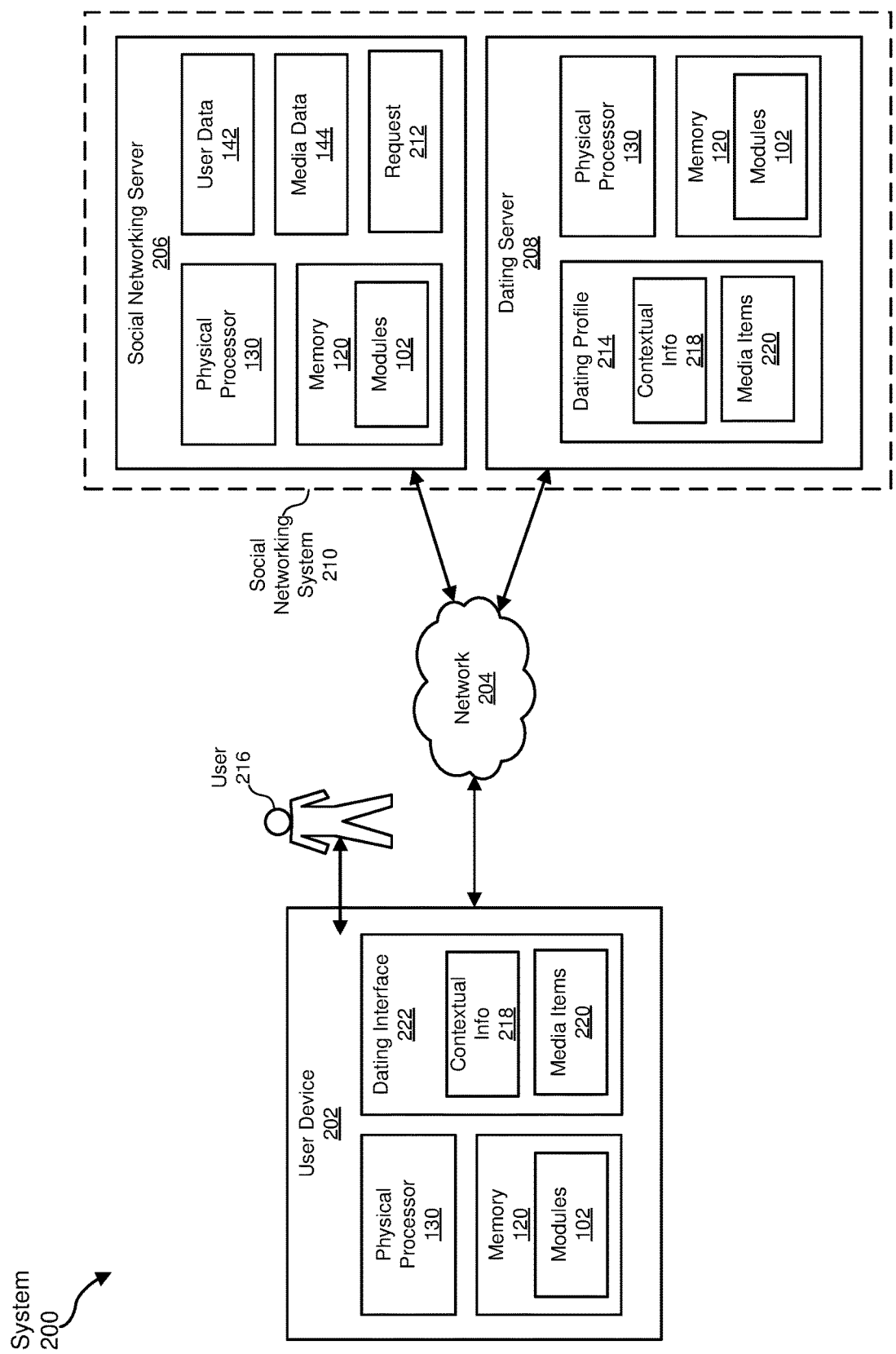
FIG. 2 is a block diagram of an example implementation of a system for generating a dating profile for a community-based dating service of a social networking system.

Example system 100 in FIG. 1 may be implemented in a variety of ways. For example, all or a portion of example system 100 may represent portions of an example system 200 ("system 200") in FIG. 2. As shown in FIG. 2, system 200 may include a user device 202 in communication with a social networking server 206 ("server 206") and a dating server 208 ("server 208") via network 204. In at least one example, user device 202 may be programmed with one or more of modules 102. Additionally or alternatively, server 206 and/or server 208 may be programmed with one or more of modules 102.

User device 202 generally represents any type or form of computing device capable of reading and/or executing computer-executable instructions. In at least one embodiment, user device 202 may accept one or more directions from server 206 and/or server 208. Examples of user device 202 include, without limitation, servers, desktops, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable computing device.

Network 204 generally represents any medium or architecture capable of facilitating communication and/or data transfer between user device 202, server 206, and/or server 208. Examples of network 204 include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), universal serial bus (USB) connections, proprietary data connections, and the like. Network 204 may facilitate communication or data transfer using wireless or wired connections. In one embodiment, network 204 may facilitate communication between user device 202, server 206, and server 208.

Social networking server 206 generally represents any type or form of computing device capable of reading and/or executing computer-executable instructions and/or hosting executables. Examples of social networking server 206 include, without limitation, application servers, storage servers, database servers, web servers, and/or any other suitable computing device configured to run certain software applications and/or provide various application, storage, and/or database services. In some examples, social networking server 206 may provide a social networking service that facilitates virtual connections among users of a social networking system (e.g., social networking system 210).

Social networking system 210 may include any computing device and/or devices, software framework, and/or combination thereof usable for providing and/or hosting a service (e.g., via the Internet). In some examples, a social networking system may include a computing platform that provides a social networking service. In some examples, a social networking service may include any service and/or Internet site that manages social connections and/or shares, compiles, formats, and/or broadcasts information based on social connections. In additional examples, a friend, friendship, or a connection may be any social connection maintained by the social networking system between two users of the social networking system.

Like social networking server 206, dating server 208 generally represents any type or form of computing device capable of reading and/or executing computer-executable instructions and/or hosting executables. Examples of dating server 208 include, without limitation, application servers, storage servers, database servers, web servers, and/or any other suitable computing device configured to run certain software applications and/or provide various application, storage, and/or database services.

In some examples, dating server 208 may provide a dating service within a social networking system (e.g., social networking system 210) that enables users of the social networking system to make dating connections within the social networking system. In some examples, a dating service or a dating service within a social networking system may be any service of a social networking system that manages dating connections and/or shares, compiles, formats, and/or broadcasts information based on dating connections. In some examples, a dating connection and/or a connection within a dating service may be any social connection between at least two participants of a dating service of a social networking system that represents an interest by at least one of the participants in engaging in dating practices with the other participant or participants.

In some examples, a community, an interest-based community, and/or an interest-based community of a social networking system may include a gathering of people assembled around a subject of common interest. Examples of subjects of common interest may include, without limitation, persons, events, places, physical objects, virtual objects, concepts, themes, problems, propositions, expressions, fields, businesses, organizations, issues, works, and so forth. In some examples, a social networking system may provide one or more features that may facilitate users of the social networking system forming, maintaining, managing, administering, joining, and/or engaging with interest-based communities. For example, a social networking system may provide a "groups" feature that may enable one or more users to establish, join, interact with, and/or administer an interest-based community surrounding a particular subject. Additionally or alternatively, a social networking system may provide an "events" feature that may enable one or more users to establish, join, interact with, and/or administer an interest-based community surrounding a particular event, such as a concert, a social gathering, a meeting, and so forth. Furthermore, a social networking system may provide a "pages" feature that may enable one or more users to follow other users.

In some examples, a community-based dating service, a community-based dating feature, a community-based dating feature of a social networking system, a community-based dating feature associated with an interest-based community, and so forth, may include a feature of a social networking system that facilitates (e.g., establishes, promotes, furthers, expedites, provides tools for, etc.) formation, maintenance, and/or dissolution of dating connections between members of interest-based communities. For example, a community-based dating feature may identify members of an interest-based community who are participants in a dating service of a social networking system to other members of the interest-based community who are also participants in the dating service of the social networking system. This may enable users who share common interests (e.g., users who are both members of an interest-based community) to form dating connections with each other. By facilitating dating connections between users who already share common interests, a community-based dating feature of a social networking system may enable users to form strong, enjoyable, and valuable dating connections with other users of the social networking system more efficiently than via conventional electronic dating systems.

In at least one embodiment, one or more modules 102 from FIG. 1 may, when executed by user device 202, server 206, and/or server 208, enable user device 202, server 206, server 208 to perform one or more operations to generate a dating profile for a community-based dating service of a social networking system. For example, as will be described in greater detail below, receiving module 104 may cause user device 202, server 206, and/or server 208 to receive a request (e.g., request 212) to generate a dating profile (e.g., dating profile 214) for a user (e.g., user 216) of a community-based dating service of a social networking system based on information associated with the user and maintained by the social networking system (e.g., user data 142 and/or media data 144).

As will be described in greater detail below, In some examples, a dating profile may include any suitable information that a participant in the dating service of the social network (e.g., user 216) may wish to share with other participants in the dating service and/or may wish to keep private from users of the social networking system who are not participating in the dating service. For example, a dating profile for user 216 may include, without limitation, an image of user 216, a text description of user 216, a set of interests of user 216, a relationship status of user 216, a geographic location associated with user 216, a set of physical attributes of user 216, and so forth.

Additionally, accessing module 106 may cause user device 202, server 206, and/or server 208 to access information associated with the user and maintained by the social networking system. Selecting module 108 may cause user device 202, server 206, and/or server 208 to select, from the information associated with the user and maintained by the social networking system (1) a set of contextual information (e.g., contextual information 218, also "contextual info 218" in FIG. 2) associated with the user, and (2) a set of media items (e.g., set of media items 220, also "media items 220" in FIG. 2) associated with the user. Furthermore, generating module 110 may cause user device 202, server 206, and/or server 208 to generate the dating profile for the user by arranging the set of contextual information and the set of media items within a dating interface (e.g., dating interface 222) of the social networking system.

As noted above, in at least one example, user device 202, server 206, and server 208 may be computing devices programmed with one or more of modules 102. All or a portion of the functionality of modules 102 may be performed by user device 202, server 206, server 208, and/or any other suitable computing system. As will be described in greater detail below, one or more of modules 102 from FIG. 1 may, when executed by at least one processor of user device 202, server 206, and/or server 208, may enable user device 202, server 206, and/or server 208 to generate a dating profile for a community-based dating service of a social networking system.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
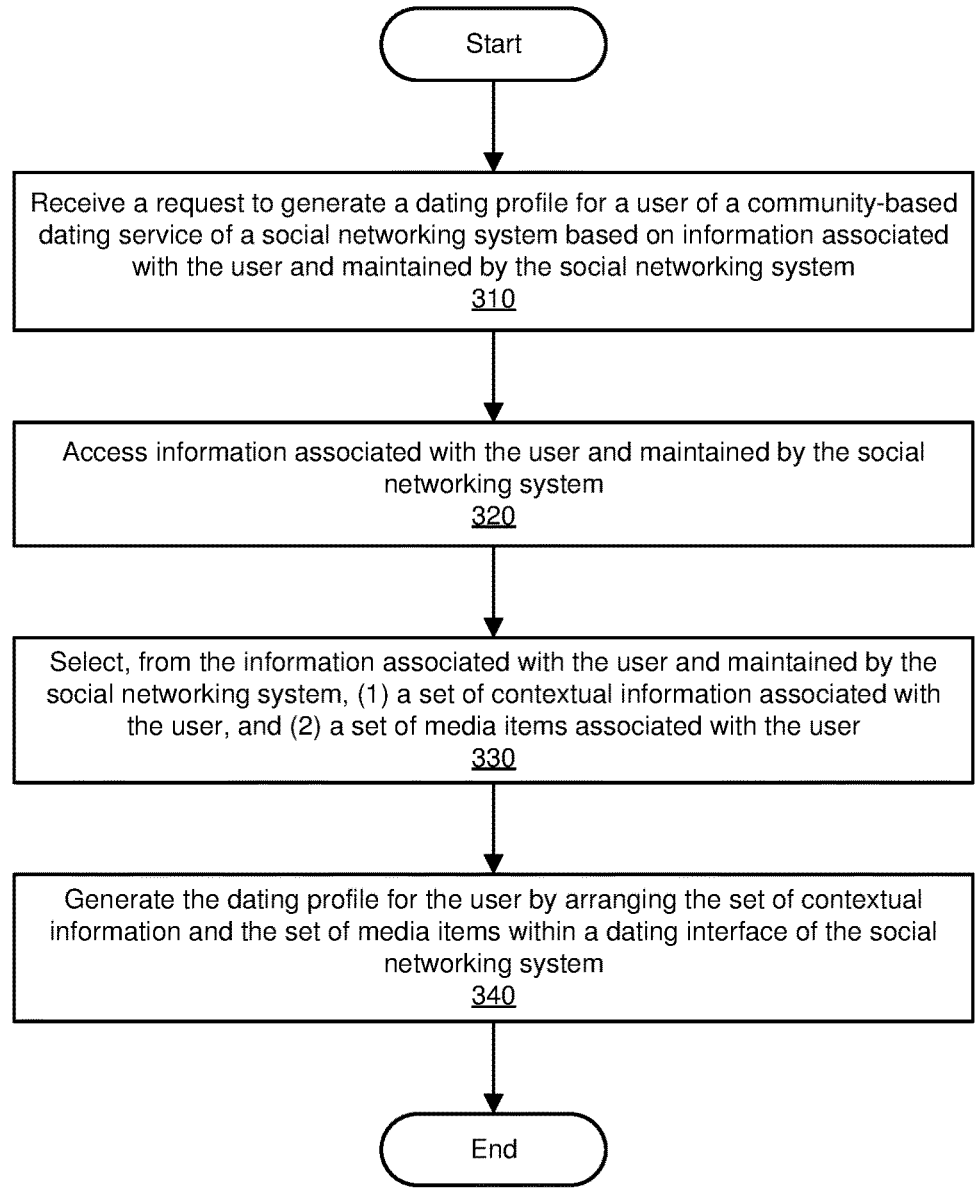
FIG. 3 is a flow diagram of an example method for generating a dating profile for a community-based dating service of a social networking system.

FIG. 3 is a flow diagram of an example computer-implemented method 300 for allocating shared resources in multi-tenant environments. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may receive a request to generate a dating profile for a user of a community-based dating service of a social networking system based on information associated with the user and maintained by the social networking system. For example, receiving module 104 may, as a part of user device 202, server 206, and/or server 208 in FIG. 2, receive request 212 to generate dating profile 214 for user 216 based on information associated with user 216 and included in user data 142 and/or media data 144.

As mentioned above, in some examples, a dating profile (e.g., dating profile 214) may include any suitable information that a participant in the dating service of the social network (e.g., user 216) may wish to share with other participants in the dating service and/or may wish to keep private from users of the social networking system who are not participating in the dating service. For example, a dating profile for user 216 may include, without limitation, an image of user 216, a text description of user 216, a set of interests of user 216, a relationship status of user 216, a geographic location associated with user 216, a set of physical attributes of user 216, and so forth.

Receiving module 104 may cause user device 202, server 206, and/or server 208 to receive request 212 to generate dating profile 214 in a variety of contexts. For example, at least one of modules 102 (e.g., receiving module 104) may cause user device 202 to present, within a suitable user interface such as dating interface 222, a control that, when interacted with (e.g., touched, clicked on, selected, etc.) by a user (e.g., user 216), may cause receiving module 104 to receive request 212.

Figure 4:
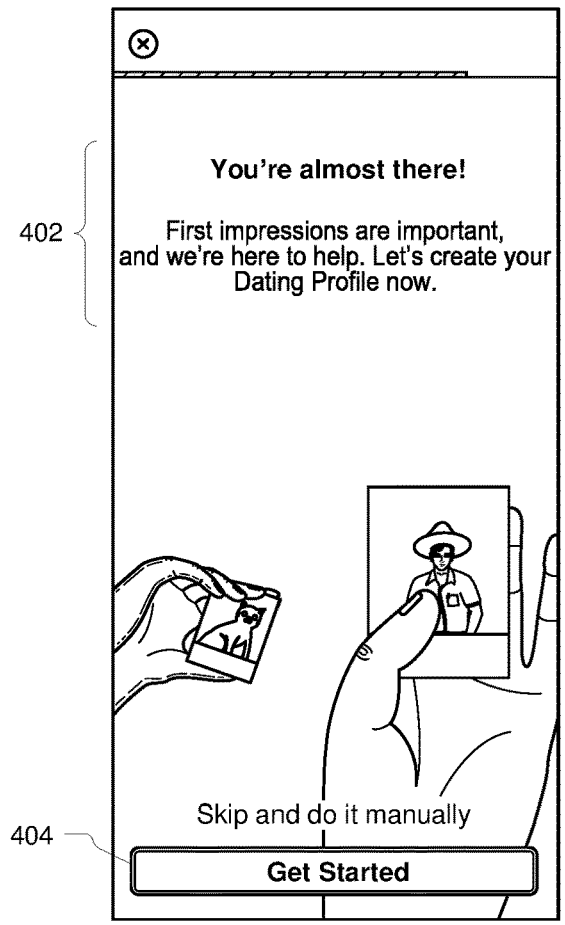
FIG. 4 is a view of a user interface of a social networking system that may receive a request to generate a dating profile in accordance with some embodiments described herein.

By way of illustration, FIG. 4 shows a user interface view 400 of a dating interface of a community-based dating service of a social networking system. As shown, interface view 400 includes an instructional message 402 and a start control 404. Instructional message 402 may instruct a user that views interface view 400 (e.g., user 216) that, when the user selects start control 404, one or more of the systems described herein (e.g., receiving module 104) may receive a request to generate a dating profile for the user based on information associated with the user and maintained by the social networking system. A user (e.g., user 216) may interact with start control 404. This interaction may cause receiving module 104 to receive request 212, such as by causing user device 202 to send information representative of request 212 to social networking server 206 and/or dating server 208 via network 204. Additional examples and illustrations of these principles will be provided below in reference to at least FIGS. 8 and 14.

Returning to FIG. 3, at step 320, one or more of the systems described herein may access information associated with the user and maintained by the social networking system. For example, accessing module 106 may, as a part of user device 202, server 206, and/or server 208 in FIG. 2, access information associated with user 216 and maintained by social networking system 210, such as information associated with user 216 included as part of user data 142 and/or media data 144.

Accessing module 106 may access information associated with user 216 and maintained by social networking system 210 in a variety of contexts. For example, accessing module 106 may, as part of social networking server 206 and/or dating server 208, access user data 142 and/or media data 144 that may be maintained by social networking server 206 (e.g., within data store 140). As shown in FIG. 2, social networking server 206 may be included as part of social networking system 210. As mentioned above, user data 142 and/or media data 144 may include and/or maintain information associated with user 216. Hence, by accessing user data 142 and/or media data 144 maintained by social networking server 206, accessing module 106 may access information associated with user 216 and maintained by social networking system 210.

Returning to FIG. 3, at step 330, one or more of the systems described herein may select, from the information associated with the user and maintained by the social networking system, (1) a set of contextual information associated with the user, and (2) a set of media items associated with the user. For example, selecting module 108 may, as part of user device 202, server 206, and/or server 208 in FIG. 2, select, from the information associated with user 216 and maintained by the social networking system 210 (e.g., as part of user data 142 and/or media data 144), (1) set of contextual information 218 (also "contextual information 218" herein), and (2) set of media items 220 (also "media items 220" herein).

In some examples, contextual information associated with the user may include any information that may describe the user such as, without limitation, a homeplace of the user, a place of residence of the user, an employer of the user, a school associated with the user, a relationship status of the user, a message from the user to participants in a community-based dating service of the social networking system, a geographic location associated with the user, and so forth. In some examples, contextual information associated with the user may additionally or alternatively include an age of the user, a job title of the user, a relationship of the user to another person (e.g., a parent, a child, a sibling, etc.), a message from the user to other users of the social networking system, and so forth.

Selecting module 108 may select contextual information 218 and media items 220 in a variety of contexts. For example, selecting module 108 may determine that particular items of contextual information may be helpful in forming connections within a community-based dating service, and may select contextual information 218 based on such a determination. For example, selecting module 108 may determine (e.g., based on administrator-entered control data) that a user's geographic location may be particularly helpful in forming dating connections with participants in a community-based dating service. Selecting module 108 may identify, within user data 142, information associated with a geographic location associated with user 216 (e.g., a city, a latitude and a longitude, a street address, etc.) and may include the geographic location associated with the user as part of contextual information 218.

Additionally, in some embodiments, selecting module 108 may select media items 220 by determining that a level of engagement within social networking system 210 associated with a media item associated with user 216 is greater than a threshold value, and including the media item in media items 220 based on that determination. It may be that media items with a relatively high level of engagement within the social networking system may be more likely to be helpful in creating an effective dating profile than media items with lower levels of engagement. Hence, selecting module 108 may select media items for inclusion in set of media items 220 based on a level of engagement within social networking system 210 being greater than a threshold value.

Selecting module 108 may determine the level of engagement associated with the media item in any suitable way, based on any suitable criteria. For example, the level of engagement within the social networking system associated with the media item may be based on a recency of the media item (e.g., how long ago the user uploaded the media item to the social networking system, how long ago the user shared the media item within the social networking system, a date of creation associated with the media item, etc.). In some examples, selecting module 108 may determine that a more recent media item may have a higher level of engagement than a less recent media item, and may select—and include within media items 220—the more recent media item rather than the less recent media item.

In some embodiments, selecting module 108 may additionally or alternatively determine a level of engagement within the social networking system associated with a media item based on a number of times users of the social networking system have interacted with (e.g., selected, viewed, commented on, etc.) the media item, a number of users who have indicated approval of the media item (e.g., a number of users who have "liked" the media item), whether the user has featured the media item within a profile of the user within the social networking system, combinations or variations of the foregoing, and so forth.

For example, a first image uploaded by user 216 to social networking system 210 and stored as part of media data 144 may have been "liked" by 5 users, whereas a second media item uploaded by user 216 to social networking system 210 and stored as part of media data 144 may have been "liked" by 10 users. Selecting module 108 may determine that the second media item has a higher level of engagement within the social networking system than the first media item, and hence may include the second media item in, but omit the first media item from, set of media items 220. Additionally or alternatively, a threshold value for inclusion in set of media items 220 may be 7 "likes". Because the first media item has fewer likes than the threshold value, selecting module 108 may omit the first media item from set of media items 220. Likewise, because the second media item has greater than the threshold value, selecting module 108 may include the second media item in set of media items 220.

In some embodiments, selecting module 108 may select set of media items 220 associated with user 216 based on content included in a media item. For example, selecting module 108 may select set of media items 220 associated with user 216 by identifying at least one object represented within a media item associated with the user, and including the media item in set of media items 220 based on the object represented within the media item. Selecting module 108 may identify the object represented within the media item in any suitable way, such as by analyzing the media item in accordance with a facial recognition algorithm and/or a trained machine learning classification algorithm.

For example, selecting module 108 may analyze an image uploaded by user 216 to social networking system 210 using a facial recognition algorithm and/or a trained machine learning classification algorithm. Based on this analysis, selecting module 108 may identify that the image includes at least a portion of user 216. It may be that including images that include a user in a dating profile may improve a quality or effectiveness of the dating profile. Hence, selecting module 108 may include the image in set of media items 220 based on identifying the portion of user 216 in the image.

Additionally or alternatively, selecting module 108 may identify, based on analysis via a facial recognition algorithm and/or a trained machine learning classification algorithm, an additional person within an image uploaded by the user to social networking system 210. It may be that including images that include both the user and an additional person within a dating profile may improve a quality or effectiveness of the dating profile. Hence, selecting module 108 may include the image within set of media items 220 based on the image including the additional person.

Additionally or alternatively, selecting module 108 may identify, based on analysis via a facial recognition algorithm and/or a trained machine learning classification algorithm, a pet (e.g., a dog, a cat, a fish, a bird, etc.) of the user in an image uploaded by the user to social networking system 210. It may be that including images that include a pet of a user within a dating profile may improve a quality or effectiveness of the dating profile. Hence, selecting module 108 may include the image within set of media items 220 based on the image including the pet of the user.

In additional examples, selecting module 108 may identify, from user data 142, an activity associated with a user such as a hobby, pastime, or interest. Selecting module 108 may then determine (e.g., based on analysis via a facial recognition algorithm and/or a trained machine learning classification algorithm) that at least one object represented in the image is associated with the activity. For example, selecting module 108 may identify, based on information included in user data 142, that user 216 enjoys snowboarding. Furthermore, selecting module 108 may identify, based on analysis via a trained machine learning classification algorithm, a snowboard in an image uploaded by user 216 to social networking system 210. It may be that including images that include or illustrate activities associated with a user in a dating profile may improve a quality or effectiveness of the dating profile. Hence, selecting module 108 may include the image within set of media items 220 based on the image including an object associated with an activity associated with user 216.

By selecting media items for inclusion in a dating profile for a user in accordance with the systems and methods described herein, embodiments of the present disclosure may select media items that may improve a quality or effectiveness of the dating profile, and hence may simplify and/or improve creation of dating profiles for a community-based dating service of a social networking system.

Returning to FIG. 3, at step 340, one or more of the systems described herein may generate the dating profile for the user by arranging the set of contextual information and the set of media items within a dating interface of the social networking system. For example, generating module 110 may, as a part of user device 202, server 206, and/or server 208 in FIG. 2, generate dating profile 214 for user 216 by arranging set of contextual information 218 and set of media items 220 within dating interface 222.

Generating module 110 may generate dating profile 214 for user 216 in a variety of contexts. For example, one or more of the systems described herein may include a set of predefined templates that may indicate one or more layouts for dating profile 214. Each template may include information that may indicate a visual arrangement for set of contextual information 218 and/or set of media items 220 within dating interface 222. Generating module 110 may generate dating profile 214 by selecting a template from the set of templates and arranging set of contextual information 218 and set of media items 220 in accordance with the selected template.

Figure 5:
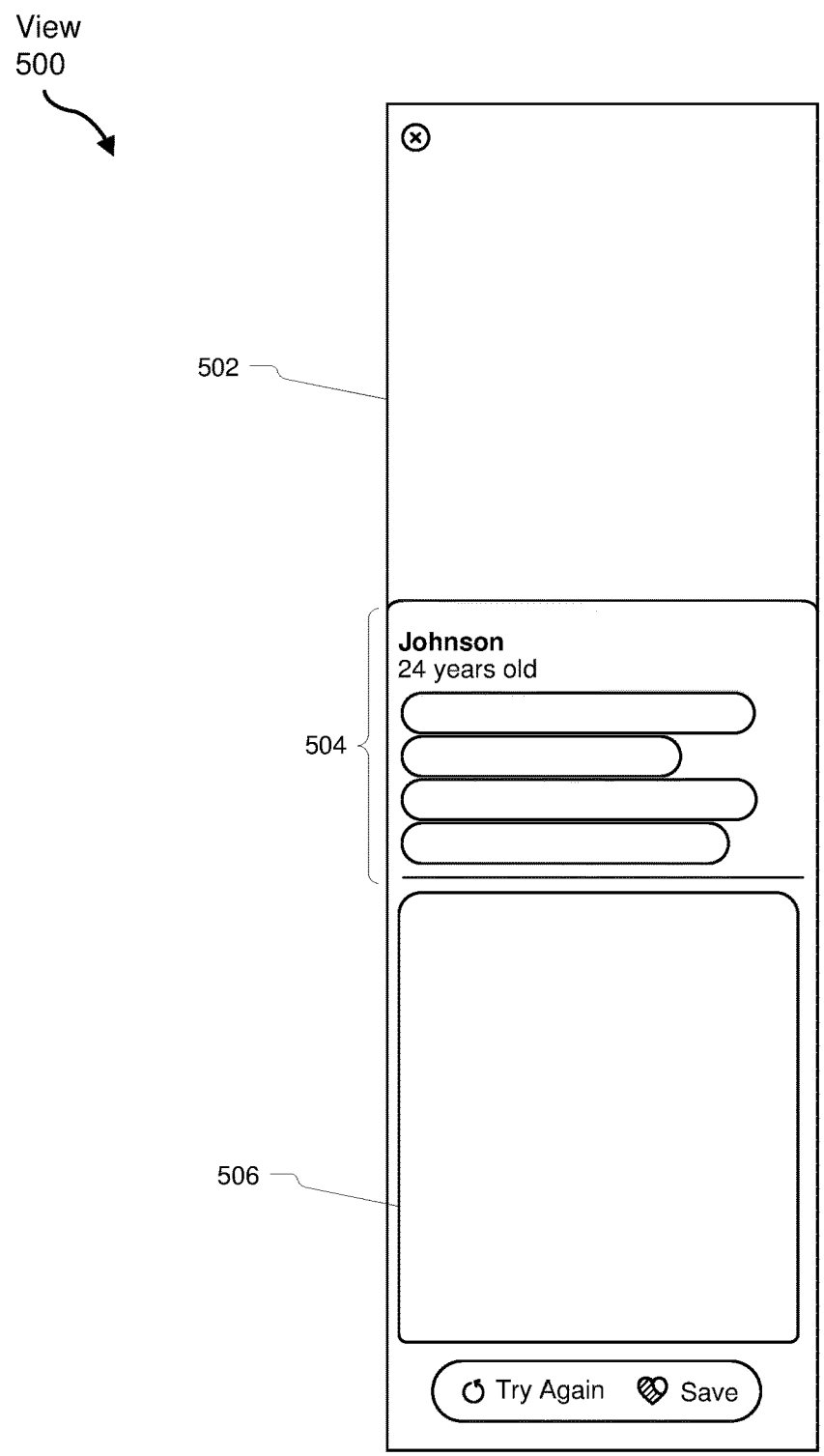
FIG. 5 is a view of a user interface of a social networking system that may include a template for a dating profile in accordance with some embodiments described herein.

FIG. 5 shows a user interface view 500 of an example template for a dating profile. As shown, user interface view 500 includes a profile image location 502, a contextual information section 504, and an image location 506. Generating module 110 may generate dating profile 214 for user 216 by arranging set of contextual information 218 within contextual information section 504 and set of media items 220 within profile image location 502 and/or image location 506. Although not shown in FIG. 5, user interface view 500 may further include additional locations for any additional information included in set of contextual information 218 and/or any additional media items included in set of media items 220.

In additional or alternative embodiments, generating module 110 may generate dating profile 214 by dynamically arranging set of contextual information 218 and set of media items 220 without a predefined template. For example, generating module 110 may dynamically arrange set of contextual information 218 and set of media items 220 based on any suitable criteria, such as a size of one or more media items included in set of media items 220, a recency of one or more media items included in set of media items 220, content of set of contextual information 218, content of set of media items 220, and so forth.

Figure 6:
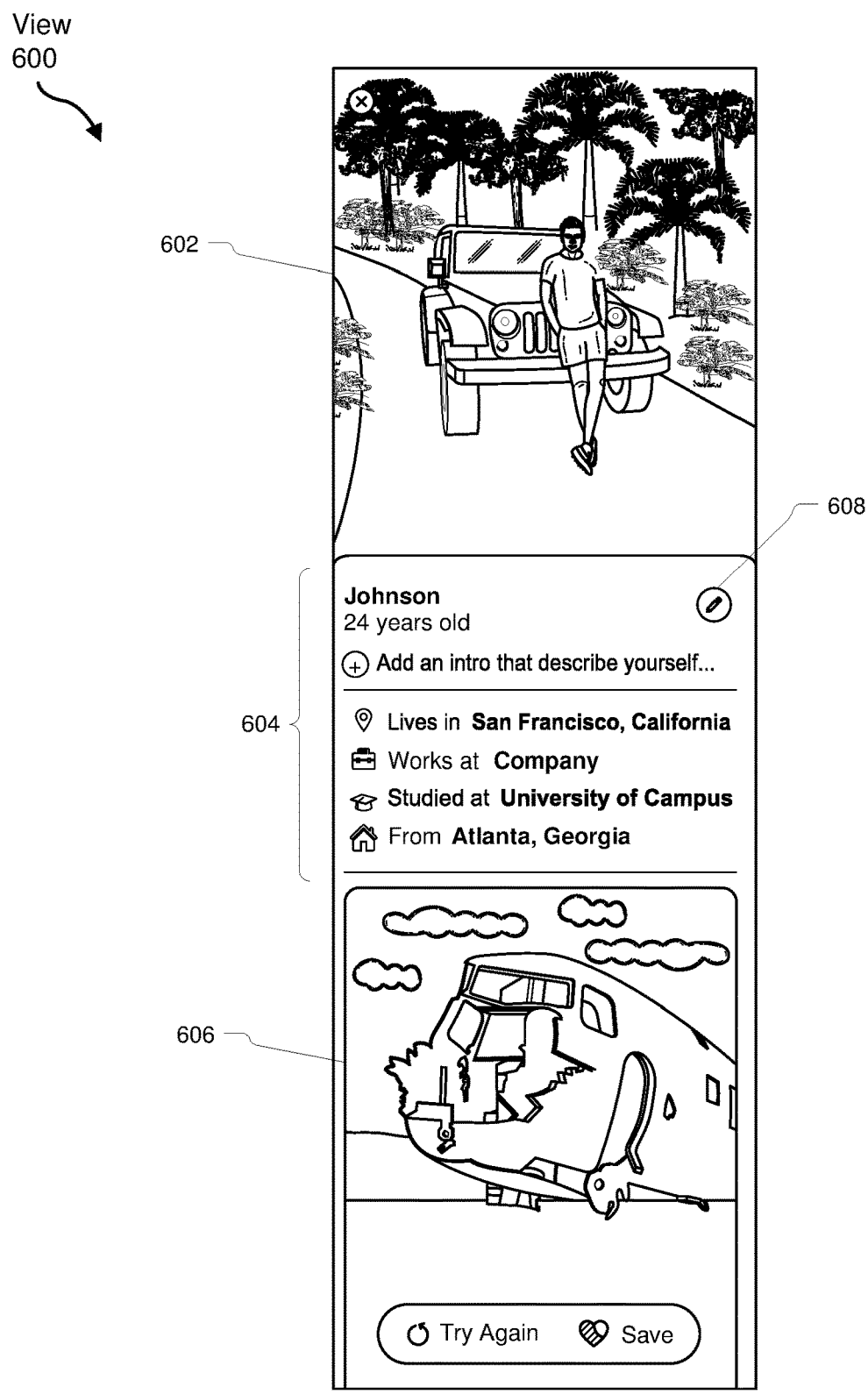
FIGS. 6-16 include views of user interfaces of a social networking system that may enable a user to adjust, modify, or regenerate a dating profile in accordance with some embodiments described herein.

FIG. 6 shows a user interface view 600 of an example dating interface that includes a dating profile generated by generating module 110 in accordance with the systems and methods described herein and presented within a preview interface of social networking system 210. A preview interface may include any interface or interface view that may be arranged in a way to mimic or have similarity to an actual interface view of a social networking system, but that may enable a user to adjust one or more elements included in the preview interface. For example, user interface view 600 may substantially resemble a dating profile that generating module 110 may generate, but may also include one or more editing controls that, when selected by the user, may enable the user to adjust one or more elements included in user interface view 600.

As shown in FIG. 6, a dating profile generated by generating module 110 may include a profile picture 602 positioned within profile image location 502, a set of contextual information 604 positioned and/or arranged within contextual information section 504, and at least one media item 606 (e.g., a user image) positioned within image location 506.

As mentioned above, user interface view 600 may be an example of a preview interface and may therefore include a contextual item edit control 608 that may be associated with a set of contextual information (e.g., set of contextual information 218 and/or set of contextual information 604). A user (e.g., user 216) may interact with (e.g., touch, click on, select, etc.) contextual information editing control 608. In response, one or more of modules 102 (e.g., generating module 110) may present a contextual information editing interface view that may enable the user to adjust or modify contextual information 604.

Figure 7:

FIG. 7 shows a user interface view 700 of a contextual item editing interface that one or more of modules 102 (e.g., generating module 110) may present within a dating interface of a social networking system. As shown, user interface view 700 may include an introduction section 702 that may be an editing tool for an introduction statement that a user (e.g., user 216) may wish to share with participants in the dating service. User interface view 700 further includes a contextual information editing interface 704 that may present one or more items of contextual information associated with the user (e.g., set of contextual information 218 associated with user 216). The user may interact with various controls included in user interface view 700 to modify contextual information associated with the user and included in dating profile 214.

For example, user interface view 700 includes a listing for "City. Visible" with "San Francisco, Calif." shown. This may indicate that set of contextual information 218 indicates that user 216 is associated with San Francisco, Calif., and that the user desires his or her city to be shown to participants in the community-based dating service. User 216 may interact with one or more controls included in contextual information editing interface 704 and associated with the city listing to adjust the city contextual information, such as changing "San Francisco, Calif." to "Palo Alto, Calif." or any other suitable geographic location, municipality, political subdivision, and so forth.

Figure 8:
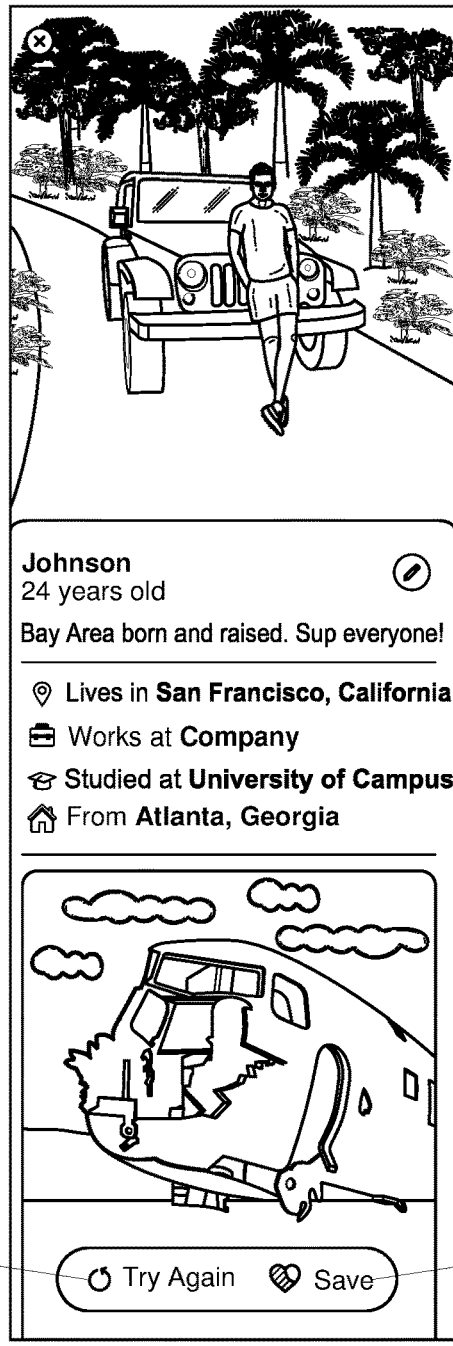

FIG. 8 shows a user interface view 800 of an example dating interface that includes a dating profile that one or more of modules 102 (e.g., generating module 110) may present within a preview interface of social networking system 210. As shown, a user (e.g., user 216) has adjusted and/or added to contextual information shown in contextual information section 802 (e.g., adjusted and/or added to contextual information included in contextual information 604 and/or introduction section 702) to include an introduction for the user to other participants in a community-based social networking system that reads "Bay Area born and raised. Sup everyone!"

User interface view 800 further includes a save control 804. A user (e.g., user 216) may interact with (e.g., touch, click on, select, etc.) save control 804, which may cause one or more of modules 102 (e.g., generating module 110) to receive a user directive to save a current configuration of contextual items and/or media items shown in user interface view 800 as at least part of a design, layout, or arrangement of a dating profile (e.g., dating profile 214). In response to receiving the user directive to save the current configuration, one or more of modules 102 (e.g., generating module 110) may cache, maintain, store, or otherwise save the current configuration of contextual items and/or media items shown in user interface view 800 as at least part of a design, layout, arrangement, etc. of a dating profile (e.g., dating profile 214) for a dating service of a social networking system. One or more components of the community-based dating service may then access the dating profile and may display, exhibit, arrange, or otherwise present the saved configuration of contextual items and/or media items shown in user interface 800 as at least part of a design, layout, arrangement, etc. of a dating profile (e.g., dating profile 214) when presenting the dating profile within an interface of the community-based dating service of the social networking system.

Furthermore, user interface view 800 also includes a regeneration control 806. A user (e.g., user 216) may interact with (e.g., touch, click on, select, etc.) regeneration control 806, which may cause one or more of modules 102 (e.g., generating module 110) to receive a user directive to regenerate at least part of a dating profile. For example, the user may dislike one or more media items included in set of media items 220. The user may interact with regeneration control 806 to cause one or more of the systems described herein (e.g., generating module 110) to regenerate a dating profile using at least a partially different set of contextual items and/or set of media items.

The systems and methods described herein may regenerate the dating profile in a variety of contexts. For example, one or more of modules 102 (e.g., receiving module 104, generating module 110) may receive, via regeneration control 806, a direction to regenerate the dating profile. One or more of modules 102 (e.g., accessing module 106, generating module 110, etc.) may re-access information associated with the user and maintained by the social networking system (e.g., user data 142 and/or media data 144). One or more of modules 102 (e.g., selecting module 108, generating module 110, etc.) may select, from the information associated with the user and maintained by the social networking system, an additional set of contextual information and/or an additional set of media items associated with the user.

In some examples, the additional set of contextual information may include one or more items of contextual information included in set of contextual information 218. In additional examples, the additional set of contextual information and set of contextual information 218 may be disjoint, in that they may not share any contextual information in common. Likewise, in some examples, the additional set of media items may include one or more media items included in set of media items 220. In additional examples, the additional set of media items and set of media items 220 may be disjoint, in that they may not share any media items in common.

One or more of modules 102 may further regenerate the dating profile for the user by arranging the additional set of media items within the dating interface of the social networking system. The foregoing operations may be performed in any of the ways described herein in reference to functions of example system 100 and/or example system 200, such as via various functions of receiving module 104, accessing module 106, selecting module 108, and/or generating module 110 described herein.

Figure 9:
Figure 9:
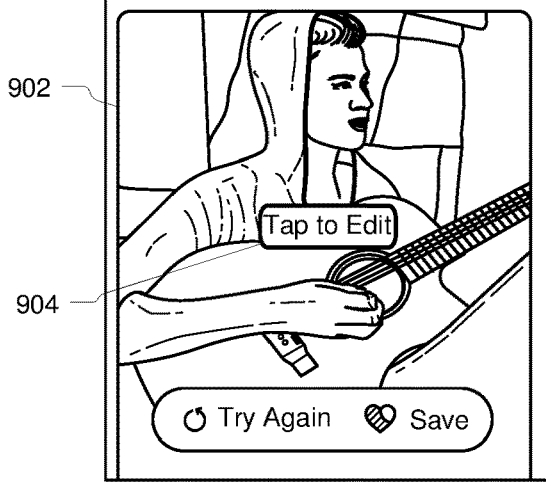

FIG. 9 includes a user interface view 900 of an example dating interface that includes a regenerated dating profile. As shown, a user (e.g., user 216) has interacted with a regeneration control such as regeneration control 806. In response, one or more of modules 102 (e.g., receiving module 104, accessing module 106, selecting module 108, and/or generating module 110) has regenerated dating profile 214 as described above, such that the regenerated dating profile now includes media item 902 positioned within image location 506 instead of media item 606.

As also shown in FIG. 9, user interface view 900 may further include a media item edit control 904 that may be associated with at least one media item included in a set of media items presented within a dating profile and/or a dating interface. A user (e.g., user 216) may interact with (e.g., touch, click on, select, etc.) media item edit control 904, which may cause one or more of modules 102 (e.g., receiving module 104, generating module 110, etc.) to receive a user direction to adjust at least one media item included in the set of media items (e.g., set of media items 220, an additional set of media items, etc.). In the example illustrated in FIG. 9, media item edit control 904 may be associated with media item 902.

Figure 10:
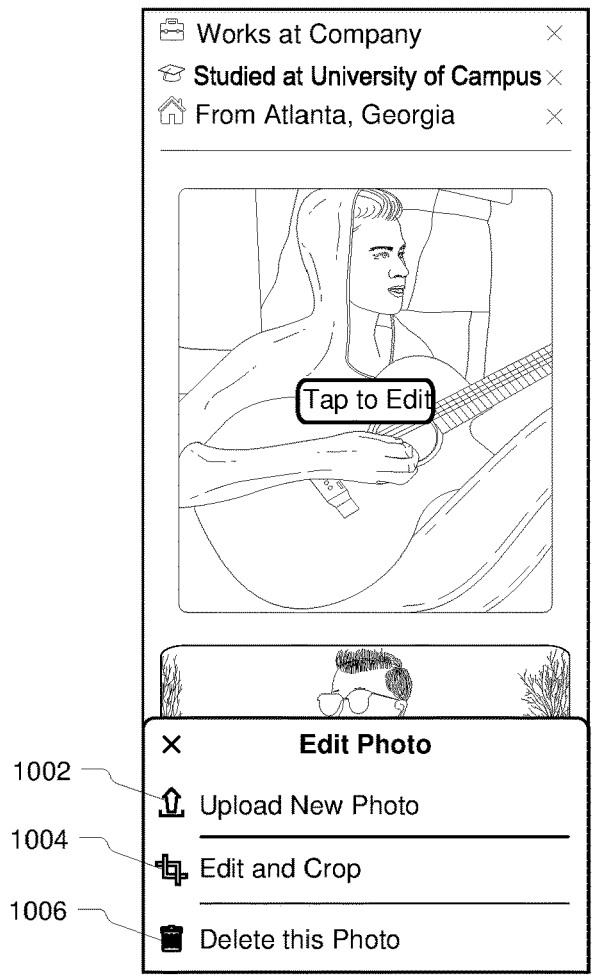

FIG. 10 includes a user interface view 1000 of an example dating interface that includes a media item adjustment menu that includes an upload control 1002, an edit control 1004, and a delete control 1006. A user (e.g., user 216) may interact with a media item edit control (e.g., media item edit control 904), which may cause one or more of modules 102 (e.g., generating module 110) to present one or more of these controls. A user may interact with (e.g., touch, click on, select, etc.) one or more of these controls and, in response, one or more of modules 102 (e.g., generating module 110) may present a suitable uploading interface, media editing interface, and/or deletion interface, respectively. Each of these respective interfaces may enable the user to upload new media items, edit a media item (e.g., media item 902), and/or delete a media item (e.g., media item 902).

Figure 11:

FIG. 11 includes a user interface view 1100 of an example dating interface that includes a media item addition control 1102 and an informational questionnaire control 1104. Generating module 110 may present user interface view 1100 as part of a dating profile and/or at a predetermined location within a dating profile, such as at the end of the dating profile. A user (e.g., user 216) may interact with (e.g., touch, click on, select, etc.) media item addition control 1102 and, in response, one or more of modules 102 (e.g., generating module 110) may present a media item selection interface that may enable the user to select one or more media items to add to or include in a dating profile.

Figure 12:
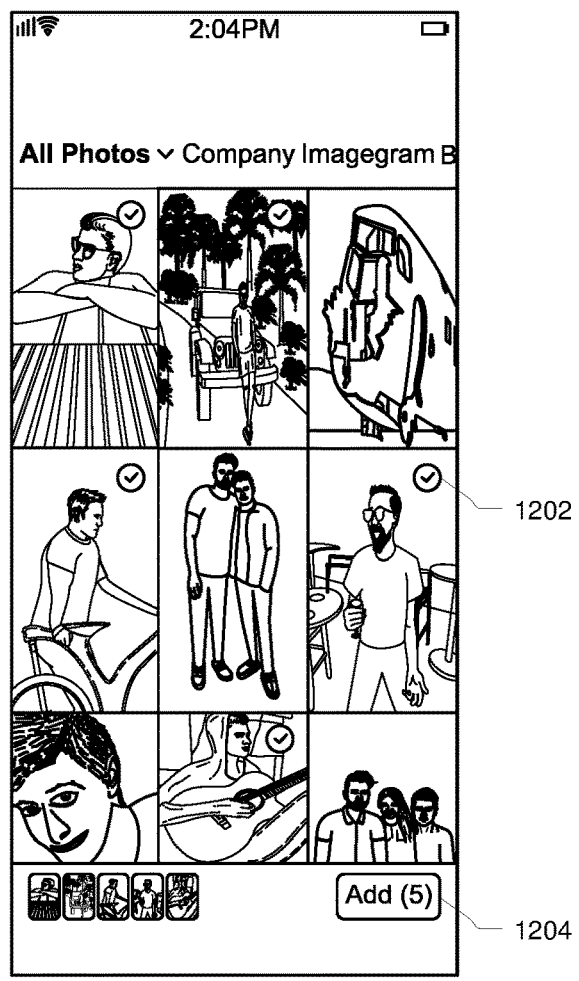

By way of example, FIG. 12 includes a user interface view 1200 of an example media item selection interface that may enable the user to select one or more media items to add to or include in a dating profile. A user (e.g., user 216) may interact with one or more controls included in user interface view 1200 to select a set of media items that the user may wish to include in a dating profile. For example, a user may interact with (e.g., touch, click on, select, etc.) a check box control 1202 that may be associated with a media item, which may indicate that the user wishes to include the media item associated with check box control 1202 in the set of media items. Once the user has selected a set of media items using one or more check box controls included in user interface view 1200, the user may interact with (e.g., touch, click on, select, etc.) add control 1204, which may cause one or more of modules 102 (e.g., receiving module 104, selecting module 108, generating module 110, etc.) to include the selected set of media items in a set of media items included in a dating profile (e.g., set of media items 220).

Returning to FIG. 11, user interface view 1100 may further include an informational questionnaire control 1104. A user (e.g., user 216) may interact with (e.g., touch, click on, select, etc.) informational questionnaire control 1104, which may cause one or more of modules 102 (e.g., receiving module 104, generating module 110, etc.) to present the user with one or more informational questionnaire interfaces that may enable the user to further set up or customize his or her dating profile by providing answers to one or more informational questions.

Figure 13:
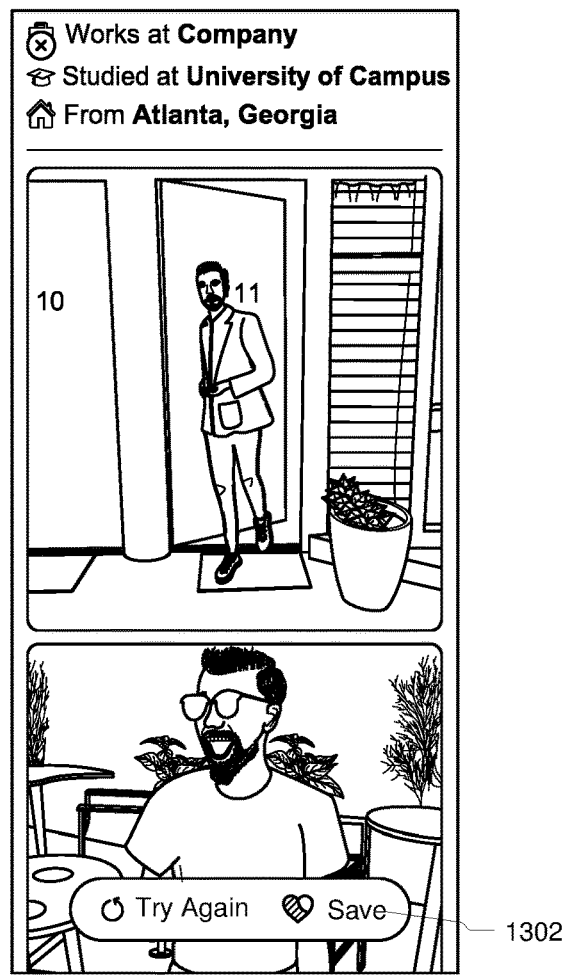
Figure 14:
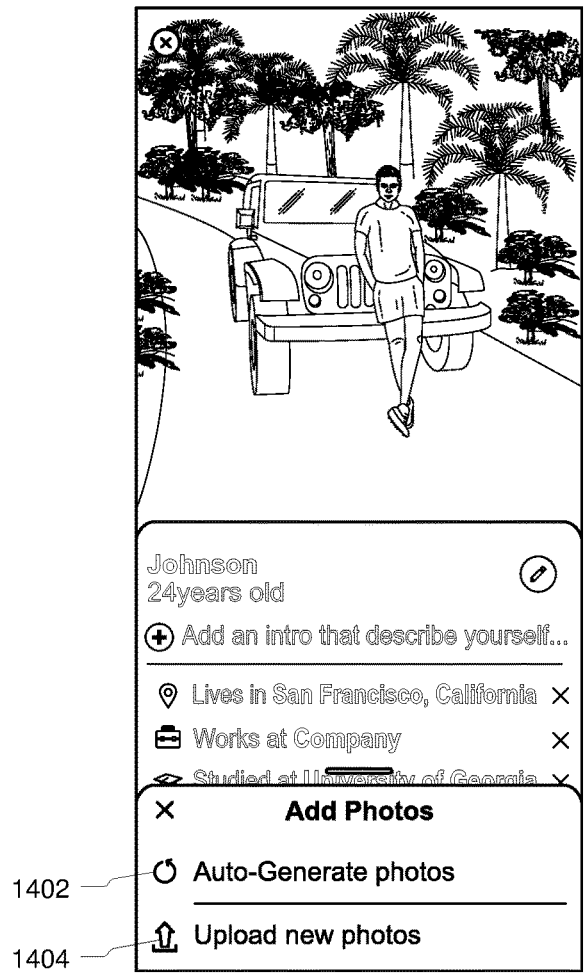

FIG. 13 includes a user interface view 1300 of a dating profile (e.g., dating profile 214) that has been generated, adjusted, and/or updated via one or more of the systems and methods described herein. One or more of modules 102 may present user interface view 1300 to enable a user (e.g., user 216) to review the dating profile. As shown, user interface view 1300 also includes a save control 1302. Similar to save control 804 described above, a user may interact with save control 1302 which may cause one or more of modules 102 (e.g., generating module 110) to receive a user directive to save a current configuration of contextual items and/or media items shown in user interface view 1300 as at least part of a design, layout, or arrangement of a dating profile (e.g., dating profile 214). In response to receiving the user directive, one or more modules 102 (e.g., receiving module 104, accessing module 106, generating module 110, etc.) may save the current configuration shown in user interface view 1300 as at least part of a design, layout, or arrangement of dating profile 214.

In some examples, the systems and methods described herein may further enable users to improve an existing dating profile. For example, FIG. 14 includes a user interface view 1400 of a dating interface. One or more of modules 102 (e.g., receiving module 104, generating module 110, etc.) may present user interface view 1400 in response to a user indicating a desire for assistance in adjusting, updating, revising, and/or improving his or her dating profile.

User interface view 1400 includes an auto-generation control 1402 and a media item upload control 1404. A user (e.g., user 216) may interact with auto-generation control 1402, which may cause one or more modules 102 to generate or adjust a dating profile in accordance with the systems and methods described herein. For example, a user may interact with auto-generation control 1402, which may cause receiving module 104 to receive a request to generate a dating profile for a user of a community-based dating service of a social networking system as described herein. Accessing module 106 may then access information associated with the user and maintained by the social networking system and selecting module 108 may select a set of contextual information associated with the user and a set of media items associated with the user as described herein. Generating module 110 may then generate the dating profile for the user in any of the ways described herein.

Furthermore, user interface view 1400 also includes a media item upload control 1404. A user (e.g., user 216) may interact with media item upload control, which may cause one or more of modules 102 (e.g., receiving module 104, generating module 110) to present a media item selection interface that may enable the user to select one or more media items to add to or include in a dating profile. In some examples, the media item selection interface may be similar to the media item selection interface illustrated by, and described above in reference to, FIG. 12.

Figure 15:
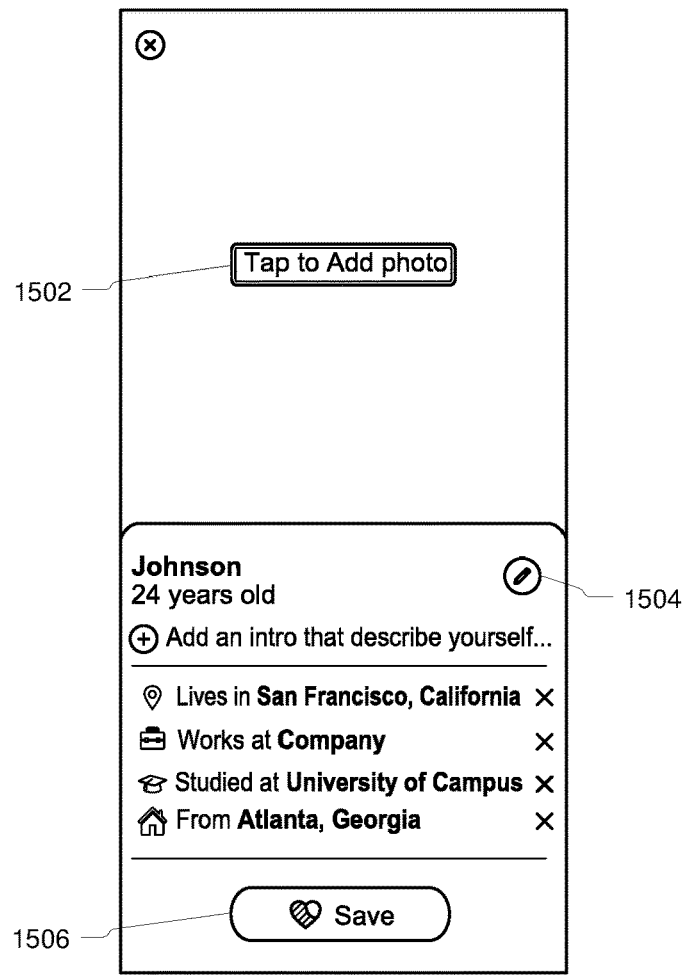

As another illustration, FIG. 15 includes a user interface view 1500 that may enable a user to add to, edit, adjust, improve, or otherwise modify a dating profile. As shown, user interface view 1500 includes elements of a dating profile, similar to user interface view 600, user interface view 800, user and/or interface view 900. User interface view 1500 further includes a media item edit control 1502. Similar to media item edit control 904 described above, a user (e.g., user 216) may interact with (e.g., touch, click on, select, etc.) media item edit control 1502, which may cause one or more of modules 102 (e.g., receiving module 104, generating module 110, etc.) to receive a user direction to adjust at least one media item included in the set of media items (e.g., set of media items 220, an additional set of media items, etc.), such as a media item associated with (e.g., positioned beneath) media item edit control 1502.

Additionally, user interface view 1500 also includes a contextual item edit control 1504. Similar to contextual item edit control 608 described above, a user (e.g., user 216) may interact with (e.g., touch, click on, select, etc.) contextual information editing control 1504. In response, one or more of modules 102 (e.g., generating module 110) may present a contextual information editing interface view (i.e., similar to user interface view 700 described above in reference to FIG. 7) that may enable the user to adjust or modify contextual information associated with contextual item edit control 1504.

User interface view 1500 also includes a save control 1506. Similar to save control 804 and/or save control 1302 described above, a user may interact with save control 1506, which may cause one or more of modules 102 (e.g., generating module 110) to receive a user directive to save a current configuration of contextual items and/or media items shown in user interface view 1500 as at least part of a design, layout, or arrangement of a dating profile (e.g., dating profile 214). In response to receiving the user directive, one or more modules 102 (e.g., receiving module 104, accessing module 106, generating module 110, etc.) may save the current configuration shown in user interface view 1500 as at least part of a design, layout, or arrangement of dating profile 214.

Figure 16:
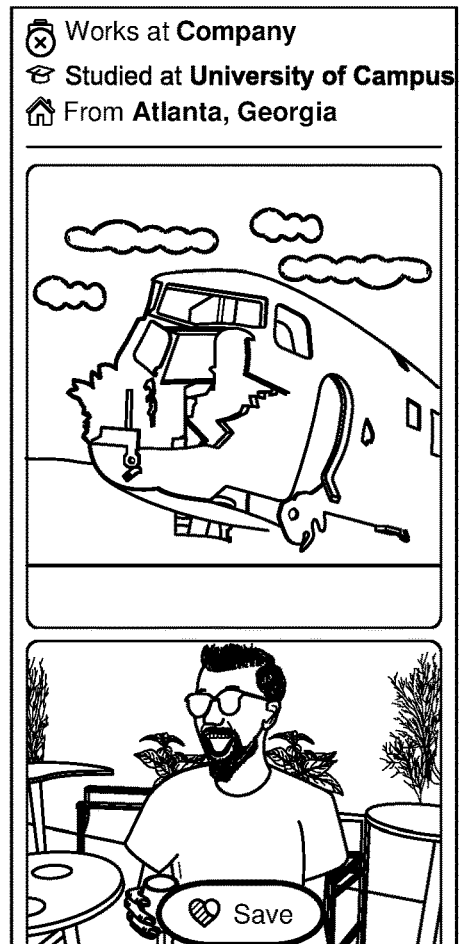

FIG. 16 includes a user interface view 1600 of a dating profile (e.g., dating profile 214) that has been generated, adjusted, and/or updated via one or more of the systems and methods described herein. One or more of modules 102 may present user interface view 1600 to enable a user (e.g., user 216) to review the dating profile. As shown, user interface view 1600 also includes a save control 1602. Similar to save control 804, save control 1302, and save control 1506 described above, a user may interact with save control 1602 which may cause one or more of modules 102 (e.g., generating module 110) to receive a user directive to save a current configuration of contextual items and/or media items shown in user interface view 1600 as at least part of a design, layout, or arrangement of a dating profile (e.g., dating profile 214). In response to receiving the user directive, one or more modules 102 (e.g., receiving module 104, accessing module 106, generating module 110, etc.) may save the current configuration shown in user interface view 1600 as at least part of a design, layout, or arrangement of dating profile 214.

As discussed throughout the instant disclosure, the disclosed systems and methods may provide one or more advantages over traditional options for generation of dating profiles. For example, by generating a dating profile for a user based on information already maintained by a social networking system, the systems and methods described herein may simplify or streamline creation of a dating profile for the user. Furthermore, systems and methods described herein may enable the user to create a dating profile that may be more effective at assisting the user in forming dating connections within a community-based dating service of the social networking system than conventional or existing ways of creating dating profiles.

EXAMPLE EMBODIMENTS

Example 1: A computer-implemented method comprising (1) receiving a request to generate a dating profile for a user of a community-based dating service of a social networking system based on information associated with the user and maintained by the social networking system, (2) accessing information associated with the user and maintained by the social networking system, (3) selecting, from the information associated with the user and maintained by the social networking system (a) a set of contextual information associated with the user, and (b) a set of media items associated with the user, and (4) generating the dating profile for the user by arranging the set of contextual information and the set of media items within a dating interface of the social networking system.

Example 2: The computer-implemented method of example 1, wherein the information associated with the user and maintained by the social networking system comprises information included in a social networking profile associated with the user.

Example 3: The computer-implemented method of any of examples 1 and 2, wherein the set of contextual information associated with the user comprises at least one of (1) a homeplace of the user, (2) a place of residence of the user, (3) an employer of the user, (4) a school associated with the user, (5) a relationship status of the user, or (6) a message from the user to participants in the community-based dating service of the social networking system.

Example 4: The computer-implemented method of any of examples 1-3, wherein selecting the set of media items associated with the user comprises (1) identifying at least one object represented within a media item associated with the user, and (2) including the media item in the set of media items associated with the user based on the object represented within the media item.

Example 5: The computer-implemented method of example 4, wherein the at least one object represented within the media item associated with the user comprises at least a portion of the user.

Example 6: The computer-implemented method of example 5, wherein the at least one object represented within the media item associated with the user further comprises at least a portion of an additional person.

Example 7: The computer-implemented method of any of examples 5-6, wherein the at least one object represented within the media item associated with the user further comprises at least a portion of a pet of the user.

Example 8: The computer-implemented method of any of examples 4-7, wherein identifying the at least one object represented within the media item associated with the user comprises: (1) identifying an activity associated with the user, and (2) determining that the at least one object represented in the media item is associated with the activity.

Example 9: The computer-implemented method of any of examples 4-8, wherein identifying the at least one object represented within the media item comprises analyzing the media item in accordance with a trained machine learning classification algorithm.

Example 10: The computer-implemented method of any of examples 4-9, wherein identifying the at least one object represented within the media item comprises analyzing the media item in accordance with a facial recognition algorithm.

Example 11: The computer-implemented method of any of examples 1-10, wherein selecting the set of media items associated with the user comprises (1) determining that a level of engagement within the social networking system associated with a media item associated with the user is greater than a threshold value, and (2) including the media item in the set of media items based on determining that the level of engagement within the social networking system associated with the media item is greater than the threshold value.

Example 12: The computer-implemented method of example 11, wherein the level of engagement within the social networking system associated with the media item is based on at least one of (1) a recency of the media item, (2) a number of times users of the social networking system have interacted with the media item, (3) a number of users who have indicated approval of the media item, or (4) whether the user has featured the media item within a profile of the user within social networking system.

Example 13: The computer-implemented method of any of examples 1-12, further comprising presenting the dating profile within a preview interface of the social networking system, the preview interface comprising (1) the arranged set of contextual information, (2) the arranged set of media items, (3) a contextual item edit control associated with the set of contextual information, and (4) a media item edit control associated with at least one media item included in the set of media items.

Example 14: The computer-implemented method of example 13, wherein (1) the preview interface further comprises a regeneration control, and (2) the computer-implemented method further comprises (a) receiving, via the regeneration control, a direction to regenerate the dating profile, (b) re-accessing information associated with the user and maintained by the social networking system, (c) selecting, from the information associated with the user and maintained by the social networking system, an additional set of media items associated with the user, and (d) regenerating the dating profile for the user by arranging the additional set of media items within the dating interface of the social networking system.

Example 15: A system comprising (1) a receiving module, stored in memory, that receives a request to generate a dating profile for a user of a community-based dating service of a social networking system based on information associated with the user and maintained by the social networking system, (2) an accessing module, stored in memory, that accesses information associated with the user and maintained by the social networking system, (3) a selecting module, stored in memory, that selects, from the information associated with the user and maintained by the social networking system (a) a set of contextual information associated with the user, and (b) a set of media items associated with the user, (4) a generating module, stored in memory, that generates the dating profile for the user by arranging the set of contextual information and the set of media items within a dating interface of the social networking system, and (5) at least one physical processor that executes the receiving module, the accessing module, the selecting module, and the generating module.

Example 16: The system of example 15, wherein the selecting module selects the set of media items associated with the user by (1) identifying at least one object represented within a media item associated with the user, and (2) including the media item in the set of media items associated with the user based on the object represented within the media item.

Example 17: The system of any of examples 15 and 16, wherein the selecting module selects the set of media items associated with the user by (1) determining that a level of engagement within the social networking system associated with a media item associated with the user is greater than a threshold value, and (2) including the media item in the set of media items based on determining that the level of engagement within the social networking system associated with the media item is greater than the threshold value.

Example 18: The system of any of examples 15-17, wherein the generating module further presents the dating profile within a preview interface of the social networking system, the preview interface comprising (1) the arranged set of contextual information, (2) the arranged set of media items, (3) a contextual item edit control associated with the set of contextual information, and (4) a media item edit control associated with at least one media item included in the set of media items.

Example 19: The system of example 18, wherein (1) the preview interface further comprises a regeneration control, and (2) the receiving module further receives, via the regeneration control, a direction to regenerate the dating profile, (3) the accessing module further re-accesses information associated with the user and maintained by the social networking system, (4) the selecting module further selects, from the information associated with the user and maintained by the social networking system, an additional set of media items associated with the user, and (5) the generating module further regenerates the dating profile for the user by arranging the additional set of media items within the dating interface of the social networking system.

Example 20: A non-transitory computer-readable medium comprising computer-readable instructions that, when executed by at least one processor of a computing system, cause the computing system to (1) receive a request to generate a dating profile for a user of a community-based dating service of a social networking system based on information associated with the user and maintained by the social networking system, (2) access information associated with the user and maintained by the social networking system, (3) select, from the information associated with the user and maintained by the social networking system (a) a set of contextual information associated with the user, and (b) a set of media items associated with the user, and (4) generate the dating profile for the user by arranging the set of contextual information and the set of media items within a dating interface of the social networking system.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive contextual data and/or media data to be transformed, transform the contextual data and/or media data, output a result of the transformation to generate a dating profile for a community-based dating service of a social networking system, use the result of the transformation to share the dating profile with users of the community-based dating service of the social networking system, and store the result of the transformation to enable users to adjust the dating profile. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description, including the various figures and user interface views, has been provided to enable others skilled in the art to best utilize various aspects of the example embodiments disclosed herein. This description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving a request to generate a dating profile to represent a user of a community-based dating service of a social networking system to other users of the community-based dating service;
   accessing information associated with the user and maintained by the social networking system;
   automatically selecting, from the information associated with the user and maintained by the social networking system:
   a set of contextual information associated with the user by:
      identifying an item of contextual information associated with the user and maintained by the social networking system that would be helpful to forming dating connections between the user and other users of the community-based dating service; and
      including the identified item of contextual information in the set of contextual information; and
   a set of media items associated with the user, at least one media item in the set of media items including content associated with at least one of the identified items of contextual information included in the set of contextual information;
   generating the dating profile for the user by arranging the set of contextual information and the set of media items within a dating interface of the social networking system; and
   presenting the dating profile within a preview interface of the social networking system, the review interface comprising:
      the arranged set of contextual information;
      the arranged set of media items;
      a contextual item edit control associated with the set of contextual information; and
      a media item edit control associated with at least one media item included in the set of media items.

2. The computer-implemented method of claim 1, wherein the information associated with the user and maintained by the social networking system comprises information included in a social networking profile associated with the user.

3. The computer-implemented method of claim 1, wherein the set of contextual information associated with the user comprises at least one of:
   a homeplace of the user;
   a place of residence of the user;
   an employer of the user;
   a school associated with the user;
   a relationship status of the user; or
   a message from the user to participants in the community-based dating service of the social networking system.

4. The computer-implemented method of claim 1, wherein selecting the set of media items associated with the user comprises:
   identifying at least one object represented within a media item associated with the user; and
   including the media item in the set of media items associated with the user based on the object represented within the media item.

5. The computer-implemented method of claim 4, wherein the at least one object represented within the media item associated with the user comprises at least a portion of a face of the user.

6. The computer-implemented method of claim 5, wherein the at least one object represented within the media item associated with the user further comprises an image of at least a portion of an additional person.

7. The computer-implemented method of claim 5, wherein the at least one object represented within the media item associated with the user further comprises an image of at least a portion of a pet of the user.

8. The computer-implemented method of claim 4, wherein identifying the at least one object represented within the media item associated with the user comprises:
   identifying an activity associated with the user; and determining that the at least one object represented in the media item is associated with the activity.

9. The computer-implemented method of claim 4, wherein identifying the at least one object represented within the media item comprises analyzing the media item in accordance with a trained machine learning classification algorithm.

10. The computer-implemented method of claim 4, wherein identifying the at least one object represented within the media item comprises analyzing the media item in accordance with a facial recognition algorithm.

11. The computer-implemented method of claim 1, wherein selecting the set of media items associated with the user comprises:
   determining that a level of engagement within the social networking system associated with a media item associated with the user is greater than a threshold value; and
   including the media item in the set of media items based on determining that the level of engagement within the social networking system associated with the media item is greater than the threshold value.

12. The computer-implemented method of claim 11, wherein the level of engagement within the social networking system associated with the media item is based on at least one of:
   a recency of the media item;
   a number of times users of the social networking system have interacted with the media item;
   a number of users who have indicated approval of the media item; or
   whether the user has featured the media item within a profile of the user within social networking system.

13. The computer-implemented method of claim 1, wherein:
   the preview interface further comprises a regeneration control; and
   the computer-implemented method further comprises:
      receiving, via the regeneration control, a direction to regenerate the dating profile;
      re-accessing information associated with the user and maintained by the social networking system;
      selecting, from the information associated with the user and maintained by the social networking system, an additional set of media items associated with the user; and
      regenerating the dating profile for the user by arranging the additional set of media items within the dating interface of the social networking system.

14. A system comprising:
   a receiving module, stored in memory, that receives a request to generate a dating profile to represent a user of a community-based dating service of a social networking system to other users of the community-based dating service;
   an accessing module, stored in memory, that accesses information associated with the user and maintained by the social networking system;
   a selecting module, stored in memory, that automatically selects, from the information associated with the user and maintained by the social networking system:
      a set of contextual information associated with the user by:
         identifying an item of contextual information associated with the user and maintained by the social networking system that would be helpful to forming dating connections between the user and other users of the community-based dating service; and
         including the identified item of contextual information in the set of contextual information; and
      a set of media items associated with the user, at least one media item in the set of media items including content associated with at least one of the identified items of contextual information included in the set of contextual information;
   a generating module, stored in memory, that:
      generates the dating profile for the user by arranging the set of contextual information and the set of media items within a dating interface of the social networking system; and
      presents the dating profile within a preview interface of the social networking system, the preview interface comprising:
         the arranged set of contextual information;
         the arranged set of media items;
         a contextual item edit control associated with the set of contextual information; and
         a media item edit control associated with at least one media item included in the set of media items; and
   at least one physical processor that executes the receiving module, the accessing module, the selecting module, and the generating module.

15. The system of claim 14, wherein the selecting module selects the set of media items associated with the user by:
   identifying at least one object represented within a media item associated with the user; and
   including the media item in the set of media items associated with the user based on the object represented within the media item.

16. The system of claim 14, wherein the selecting module selects the set of media items associated with the user by:
   determining that a level of engagement within the social networking system associated with a media item associated with the user is greater than a threshold value; and
   including the media item in the set of media items based on determining that the level of engagement within the social networking system associated with the media item is greater than the threshold value.

17. The system of claim 15, wherein:
   the preview interface further comprises a regeneration control; and
   the receiving module further receives, via the regeneration control, a direction to regenerate the dating profile;
   the accessing module further re-accesses information associated with the user and maintained by the social networking system;
   the selecting module further selects, from the information associated with the user and maintained by the social networking system, an additional set of media items associated with the user; and
   the generating module further regenerates the dating profile for the user by arranging the additional set of media items within the dating interface of the social networking system.

18. A non-transitory computer-readable medium comprising computer-readable instructions that, when executed by at least one processor of a computing system, cause the computing system to:
   receive a request to generate a dating profile to represent a user of a community-based dating service of a social networking system to other users of the community-based dating service;

access information associated with the user and maintained by the social networking system;
automatically select, from the information associated with the user and maintained by the social networking system:
　a set of contextual information associated with the user by:
　　identifying an item of contextual information associated with the user and maintained by the social networking system that would be helpful to forming dating connections between the user and other users of the community-based dating service; and
　　including the identified item of contextual information in the set of contextual information; and
　a set of media items associated with the user;
generate the dating profile for the user by arranging the set of contextual information and the set of media items within a dating interface of the social networking system; and
present the dating profile within a preview interface of the social networking system, the preview interface comprising:
　the arranged set of contextual information;
　the arranged set of media items;
　a contextual item edit control associated with the set of contextual information; and
　a media item edit control associated with at least one media item included in the set of media items.

19. The non-transitory computer-readable medium of claim 18, wherein the information associated with the user and maintained by the social networking system comprises information included in a social networking profile associated with the user.

20. The non-transitory computer-readable medium of claim 18, wherein the computer-readable instructions, when executed by the at least one processor of the computing system, cause the computing system to select the set of media items associated with the user by:
　identifying at least one object represented within a media item associated with the user; and
　including the media item in the set of media items associated with the user based on the object represented within the media item.

* * * * *